US012695599B2

(12) United States Patent
Heinrich

(10) Patent No.: US 12,695,599 B2
(45) Date of Patent: Jul. 28, 2026

(54) METHOD FOR USING CRYPTOGRAPHIC KEYS IN A VEHICLE ON-BOARD COMMUNICATION NETWORK

(71) Applicant: Robert Bosch GmbH, Stuttgart (DE)

(72) Inventor: Stefan Heinrich, Neckarsulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 84 days.

(21) Appl. No.: 18/346,979

(22) Filed: Jul. 5, 2023

(65) Prior Publication Data
US 2023/0396412 A1     Dec. 7, 2023

(30) Foreign Application Priority Data
Jul. 6, 2022    (DE) ..................... 10 2022 206 899.8

(51) Int. Cl.
*H04L 9/08*          (2006.01)
*H04L 9/32*          (2006.01)

(52) U.S. Cl.
CPC .......... *H04L 9/0819* (2013.01); *H04L 9/0861* (2013.01); *H04L 9/3236* (2013.01)

(58) Field of Classification Search
CPC ... H04L 9/0819; H04L 9/0861; H04L 9/3236; H04L 63/0428; H04L 2209/84; H04L 9/0863; H04L 63/06; H04L 9/3247; H04L 9/088; H04L 67/12
See application file for complete search history.

(56) References Cited

U.S. PATENT DOCUMENTS

| | | | | |
|---|---|---|---|---|
| 9,301,140 | B1 * | 3/2016 | Costigan | ............... H04L 67/306 |
| 10,285,051 | B2 * | 5/2019 | Alfred | ................... H04L 9/0838 |
| 10,965,450 | B2 * | 3/2021 | Alfred | ................... H04L 9/0838 |
| 2011/0205017 | A1 * | 8/2011 | Lazzara | ................. B60R 25/24 |
| | | | | 340/5.64 |
| 2014/0294180 | A1 * | 10/2014 | Link, II | ................. G08G 1/205 |
| | | | | 380/270 |
| 2015/0244685 | A1 * | 8/2015 | Shah | ................... H04W 12/068 |
| | | | | 713/155 |
| 2017/0178126 | A1 * | 6/2017 | Liu | ......................... G06Q 20/20 |
| 2018/0084412 | A1 * | 3/2018 | Alfred | .............. H04W 12/0431 |
| 2019/0268763 | A1 * | 8/2019 | Alfred | .................. H04L 63/061 |
| 2019/0287318 | A1 * | 9/2019 | Fukuhara | ........... H04L 63/0428 |
| 2019/0295333 | A1 * | 9/2019 | Nista | ............... G06K 19/07749 |
| 2022/0139137 | A1 * | 5/2022 | Johnson | ............. G07C 9/00857 |
| | | | | 340/5.25 |

* cited by examiner

*Primary Examiner* — Techane Gergiso
(74) *Attorney, Agent, or Firm* — NORTON ROSE FULBRIGHT US LLP

(57)          ABSTRACT
A method for using cryptographic keys in a vehicle on-board communication network. The method includes, during an initialization of a vehicle-bound power supply time period of a vehicle: generating at least one cryptographic key by a central electronic control unit for the respectively initialized vehicle-bound power supply time period of the vehicle; transferring the generated at least one cryptographic key by the central electronic control unit using at least one cryptographic algorithm to at least one further electronic control unit in the on-board communication network; using the transferred cryptographic key by at least one electronic control unit for at least one further or for the same cryptographic algorithm for a communication between the electronic control units for the duration of the respective initialized vehicle-bound power supply time period in the on-board communication network.

9 Claims, 3 Drawing Sheets central electronic control unit
generated cryptographic key transfer generated cryptographic
key to further electronic control
unit further electronic control unit
uses transferred cryptographic
key

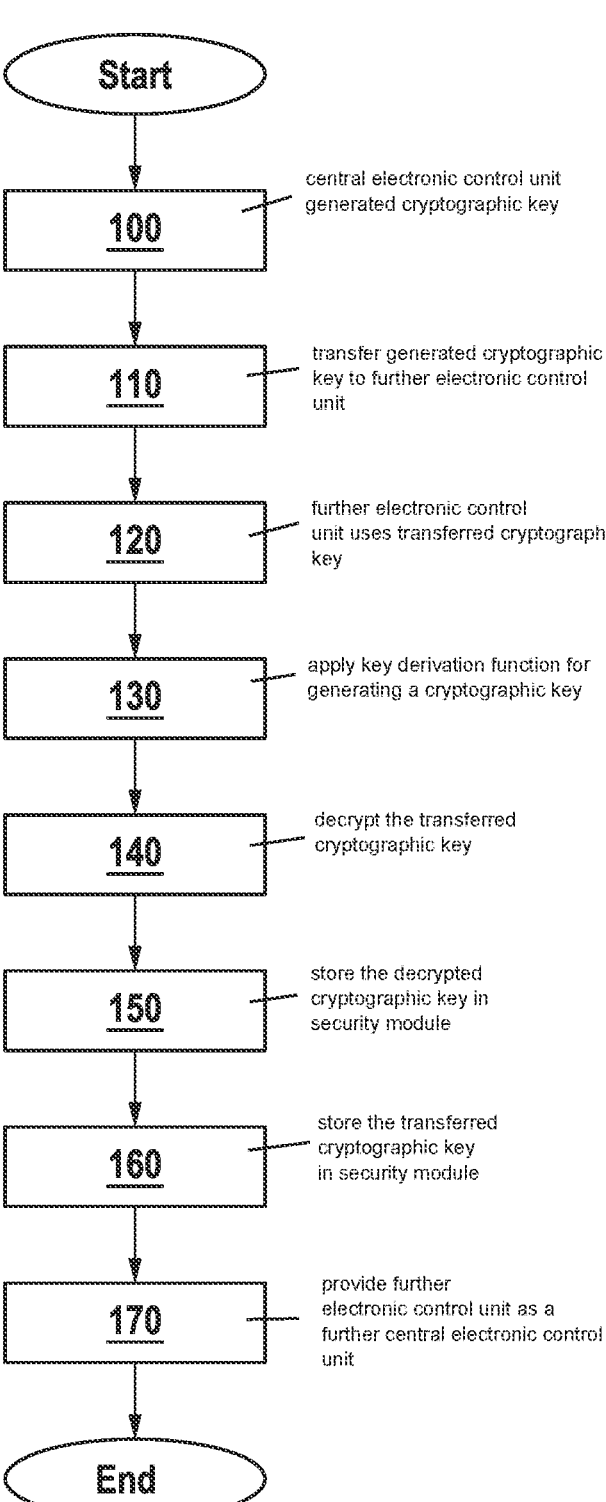

central electronic control unit generated cryptographic key transfer generated cryptographic key to further electronic control unit further electronic control unit uses transferred cryptographic key apply key derivation function for generating a cryptographic key decrypt the transferred cryptographic key store the decrypted cryptographic key in security module store the transferred cryptographic key in security module provide further electronic control unit as a further central electronic control unit

Fig. 1B

METHOD FOR USING CRYPTOGRAPHIC KEYS IN A VEHICLE ON-BOARD COMMUNICATION NETWORK

FIELD

The present invention relates to a method for using cryptographic keys in a vehicle on-board communication network. The present invention further relates to a computer program, to a device for this purpose and to a vehicle.

BACKGROUND INFORMATION

A variety of electronic control units (ECU) exists in motor vehicles for controlling the operation of various systems in a vehicle such as, for example, the drive system, the air conditioning system, the infotainment system, the body system, or the chassis system. The various control units communicate via a network installed in the vehicle in order to exchange essential pieces of data information. The protection of the vehicle functions against unauthorized access and manipulations is at the same time a central challenge for present and future control units. Cryptographic operations such as encryption and signature verification are used in this case, for example, in the immobilizer of vehicles or in the secure reprogramming of control units.

In recent years, the development of hardware support for the so-called cyber security in such vehicle networks has been pursued. One specific piece of hardware in the micro-controller—the so-called Hardware Security Module (HSM)—allows for the secure storage of keys or the acceleration of cryptographic calculations. A coordinating control unit establishes in each case a secure connection to the target control units via a so-called Key Agreement Protocol and transfers generated keys or encrypted data contents. The implementation of the Key Agreement Protocol method requires a long run-time, however, and is therefore used only for the generation and distribution of the keys.

Due to the ever-increasing networking of vehicles and also due to the increase in IT attacks on vehicle technology, it is necessary in present vehicle technology for the communication between the individual control units within the vehicle to be better protected.

This is achieved in modern control units primarily with the aid of symmetrical cryptography. Within the scope of, for example, distributed vehicle dynamics functions, this function is extremely time-critical, since corresponding latencies within the function event chain may have a significant influence on the functionality of a vehicle function. In the worst case, this may also result in vehicle instabilities and thus also in accidents. Due to the above, it must be ensured within a control unit that the cryptographic operations are able to be preferably rapidly and efficiently executed. With the current processes that are used within the control units, this means that primarily a symmetrical cryptography is used. In addition, it may occur that, depending on the processor and based on encryption algorithms used or on an existing processor load and on the time available, the need exists for the cryptographic calculation to be able to take place only on the host in order to maintain the correspondingly necessary latencies of the signals. In this case, it is necessary for the symmetrical keys to be available for the host cores and therefore unable to be secured by hardware measures of the security module. Utilizing asymmetrical cryptography alone cannot solve this problem. Moreover, a private or secret key in such a case would have to be used disadvantageously outside the security module which, however, would be unacceptable based on the required security criteria.

SUMMARY

The present invention relates to a method, a computer program, a device, and a vehicle. Features and details of the present invention result from the disclosure herein. In this case, features and details that are described in connection with the method according to the present invention naturally also apply in connection with the device according to the present invention and with the vehicle according to the present invention and vice versa in each case, so that with respect to the description, reciprocal reference is always made or may always be made to the individual aspects of the present invention.

A method according to the present invention advantageously provides for a use of cryptographic keys in a vehicle on-board communication network. In this case, according to an example embodiment of the present invention, it is provided, in particular, that during initialization of a vehicle-bound power supply time period of a vehicle, the method includes the following steps:

generating at least one cryptographic key by a central electronic control unit for the respectively initialized vehicle-bound power supply time period of the vehicle, transferring the generated at least one cryptographic key from the central electronic control unit with the aid of at least one cryptographic algorithm to at least one further electronic control unit in the on-board communication network, using the transferred cryptographic key by at least one electronic control unit for at least one further or for the same cryptographic algorithm for a communication between the electronic control units for the duration of the respective initialized vehicle-bound power supply time period in the on-board communication network.

This may have an advantage that a generation and use of at least one cryptographic algorithm significantly increases the security of the communication in a vehicle on-board communication network. The potential combination of different cryptographic algorithms advantageously allows for the respective advantages with respect to the security or the speed of a cryptographic algorithm to be able to more efficiently utilized, individually or in combination. Furthermore, the cryptographic keys used by the respective electronic control units are used in each case only for the duration of an initialized power supply time period or power cycle in the vehicle on-board communication network, which advantageously greatly increases the security of the communication network against attacks from the outside. This further enables an electronic control unit to communicate time-critical information or time-critical signals to a further electronic control unit in a significantly more time-efficient and secured manner.

The respective initialization of such a time period advantageously enables the re-generation of new cryptographic keys for a more secure encrypted communication between the electronic control units because, as a result of each initialization of the power supply time period, a new key is valid for one use only for the duration of the respectively initialized time period. A constant change of the cryptographic keys used from initialization to a re-initialization advantageously prevents a manipulation of the encrypted communication within the on-board communication network.

A cryptographic key is defined as a character sequence that is used in an encryption algorithm in order to change data in such a way that they appear to be random. As in the case of a physical key, the data are blocked (encrypted) so that only someone having the correct key is able to unblock (decrypt) them.

A power supply time period of a vehicle or a vehicle-bound power supply time period is defined as a time period during which a vehicle is supplied with power for carrying out one or multiple vehicle functions of the vehicle. Such a time period is also referred to as a power cycle. Power is, for example, a current or a voltage, which may be provided on-board the vehicle or externally thereto. A vehicle function is carried out on-board or in a vehicle-bound manner. A vehicle function, preferably a vehicle-bound or on-board vehicle function, is, for example, an opening or closing of the vehicle lock, i.e., an opening or closing of the vehicle, or an electronic immobilizer or starting or switching off a vehicle air conditioning system. A vehicle-bound power supply time period is also referred to as a so-called power cycle.

A further advantage within the scope of the present invention is achievable if the method also includes the following step:

applying a key derivation function for generating a cryptographic key via at least one electronic control unit.

This may have the advantage that by using a key derivation function (KDF), a cryptographic operation may be carried out, which generates from one cryptographic key one or multiple other cryptographic keys. This advantageously allows for a use of non-secret parameters to be able to be applied in order to derive one or multiple keys from a secret value. Such a use may advantageously prevent an attacker, who obtains a derived cryptographic key, from receiving pieces of information about the original key value or about one of the other derived keys. Furthermore, depending on the vehicle manufacturer or the vehicle parts manufacturer, this allows the ability to either specify or implement respective specific key derivation rules in order to achieve the aforementioned advantages.

It is further advantageous if the key derivation function includes a password hash function or another password-based key derivation function.

This may have the advantage that when applying such a function to a cryptographic key, preferably with the aid of repeated or of linked applications, it becomes more difficult to deduce from the key the originally encrypted data content. By increasing the number of passes, the function may advantageously be adapted to the increasing computer performance.

According to one advantageous refinement of the present invention, it may be provided that the method also includes the following steps:

decrypting the transferred at least one cryptographic key by the at least one further electronic control unit in the on-board communication network.

storing the decrypted cryptographic key in a security module of the respective electronic control unit for the duration of the respective initialized vehicle-bound power supply time period.

This may have the advantage that the transferred cryptographic key, preferably corresponding to the respective vehicle function, may be safely provided for further cryptographic operations.

According to one further possibility of the present invention, it may be provided that the method also includes the following step:

storing the transferred cryptographic key in a security module of the central electronic control unit for the duration of the respective vehicle-bound power supply time period.

This enables the central electronic control unit to advantageously use the cryptographic key transferred in the on-board communication network for an efficient, encrypted communication with the other electronic control units.

It may be further provided within the scope of the present invention that the method also includes the following step:

establishing at least one further electronic control unit as a further central electronic control unit in the event of a malfunction of the central electronic control unit for the duration of the respective initialized vehicle-bound power supply time period.

This may have the advantage that a redundant unit is predefined as a result, which is able to ensure a secure, encrypted communication within the on-board communication network in the case of a malfunction or disruption of the original central electronic control unit. This also advantageously facilitates the stability and operationally safe maintenance of time-critical and/or important vehicle functions.

It is also possible within the scope of the present invention for the initialization of the vehicle-bound power supply time period to be provided by an opening of the vehicle or by a starting of the vehicle or by a starting of a vehicle analysis.

This enables a point in time for the efficient operation of the on-board encrypted communication to be effectively established.

It may be optionally possible for the cryptographic algorithm to include a digital signing algorithm or a symmetrical encryption algorithm or an asymmetrical encryption algorithm or a combination of a digital signing algorithm and one each of the two encryption algorithms.

This has the advantage that a respective application of a signing algorithm or of a combination of the signing algorithm with one of the provided encryption algorithms such as, for example, the asymmetrical or the symmetrical encryption algorithm, optimally and efficiently ensures both the identity of a communicating electronic control unit as well as the communication with a further electronic control unit. The combination of the two encryption algorithms—also referred to as a hybrid encryption algorithm—advantageously allows for the speed of the symmetrical encryption and the high level of security of the asymmetrical encryption to be able to be utilized. The digital signing algorithm advantageously enables a secure authentication of a sender, for example, of an electronic control unit. In the case of a digital signing algorithm, a value is calculated by the sender with the aid of a secret signature key (private key) for a digital message, which is referred to as a digital signature. The calculated value enables the receiver of the digital message to verify the authorship and integrity of the message with the aid of its public so-called verification key (public key). An exemplary algorithm for such a digital signature would be, for example, a so-called AES-CMAC algorithm according to the standardized rules of the National Institute of Standards and Technology (NIST).

The subject matter of the present invention is also a computer program, in particular, a computer program product, including commands which, when the computer program is executed by a computer, prompt the computer to carry out the method according to the present invention. The computer program according to the present invention thus entails the same advantages as those that have been described in detail with reference to a method according to the present invention The computer provided may, for example, be a data processing device, which executes the computer program. The computer may include at least one processor for executing the computer program. A non-volatile data memory may also be provided, in which the computer program may be stored and from which the computer program may be read out by the processor for execution.

The subject matter of the present invention may also be a computer-readable memory medium, which includes the computer program according to the present invention. The memory medium is designed, for example, as data memory, such as a hard disk and/or a non-volatile memory and/or a memory card. The memory medium may, for example, be integrated into the computer.

The method according to the present invention may also be carried out as a computer-implemented method.

The subject matter of the present invention is also a vehicle. In this case, it is provided, in particular, that the vehicle is configured to carry out the method according to the present invention. The vehicle according to the present invention thus entails the same advantages as those that have been described in detail with reference to the method according to the present invention.

Further advantages, features and details of the present invention result from the following description, in which exemplary embodiments of the present invention are described in detail with reference to the figures. In this case the features mentioned in the description, each individually per se or in arbitrary combination, may be essential to the present invention. In the following figures, the identical reference numerals are also used for the same technical features of different exemplary embodiments.

BRIEF DESCRIPTION OF THE DRAWINGS

FIG. 1B schematically shows a further example of a method according to the present invention.

DETAILED DESCRIPTION OF EXAMPLE EMBODIMENTS

Figure 1A:
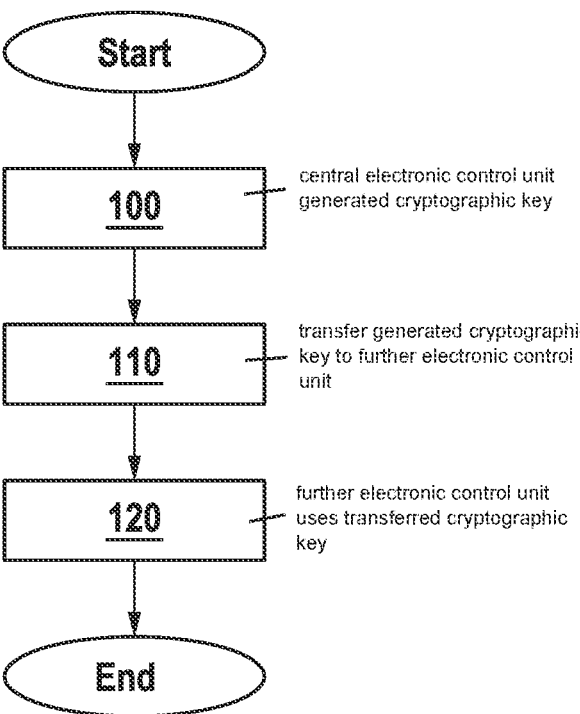
FIG. 1A schematically shows one example of a method according to the present invention.

One example of a sequence of a method according to the present invention is schematically shown in FIG. 1A. The method for using cryptographic keys in a vehicle on-board communication network 1 is carried out during an initialization of a vehicle-bound power supply time period of a vehicle.

In step 100, a central electronic control unit 10 generates at least one cryptographic key for the respectively initialized vehicle-bound power supply time period of the vehicle.

In step 110, the generated at least one cryptographic key is transferred from central electronic control unit 10 with the aid of at least one cryptographic algorithm to at least one further electronic control unit 20, 30, 40 in on-board communication network 1.

In step 120, transferred 110 cryptographic key is used by at least one electronic control unit 10, 20, 30, 40 for at least one further or for the same cryptographic algorithm for a communication between electronic control units 10, 20, 30, 40 for the duration of the respective initialized vehicle-bound power supply time period in the on-board communication network 1.

A further example of a sequence of a method according to the present invention is schematically shown in FIG. 1B. The method for using cryptographic keys in a vehicle on-board communication network 1 is carried out during an initialization of a vehicle-bound power supply time period of a vehicle.

Central electronic control unit 10 initially generates 100 at least one cryptographic key or power cycle key for the initialized power cycle of the vehicle. Central electronic control unit 10 then transfers 110 the generated at least one power cycle key with the aid of at least one cryptographic algorithm to at least one further electronic control unit 20, 30, 40 in on-board communication network 1.

Respective electronic control unit 20, 30, 40 decrypts 140 the transferred 110 cryptographic key and stores 150 the decrypted 140 cryptographic key in a security module 21, 31, 41 of respective electronic control unit 20, 20, 40. The storing in this case takes place for the duration of the respective initialized power cycle or of the vehicle-bound power supply time period.

Central electronic control unit 10 also stores 160 the transferred cryptographic key in its security module 11 for the duration of the respective initialized power cycle in order to be able to communicate with the other electronic control units in an encrypted manner using the transferred at least one cryptographic key.

For the duration of the respective initialized power cycle in on-board communication network 1, respective electronic control unit 10, 20, 30, 40 uses 120 the transferred 110 cryptographic key for at least one further or for the same cryptographic algorithm for a communication between electronic control units 10, 20, 30, 40 for the duration of the respective initialized vehicle-bound power supply time period in on-board communication network 1.

Respective electronic control unit 10, 20, 30, 40 may further apply 130 a key derivation function for generating a cryptographic key. The key derivation function in this case may include a password hash function or another password-based key derivation function. The key derivation function may further be provided by a vehicle manufacturer as an instruction for the derivation of one or of multiple keys and may be utilized by an electronic control unit.

In the sequence of a method according to the present invention schematically represented in FIG. 1B, it may be further established 170 for a failure-free operation for which at least one further electronic control unit 20, 30, 40 is to be provided as a further central electronic control unit for the duration of the respective initialized power cycle in the event of a malfunction of central electronic control unit 10.

Figure 2:
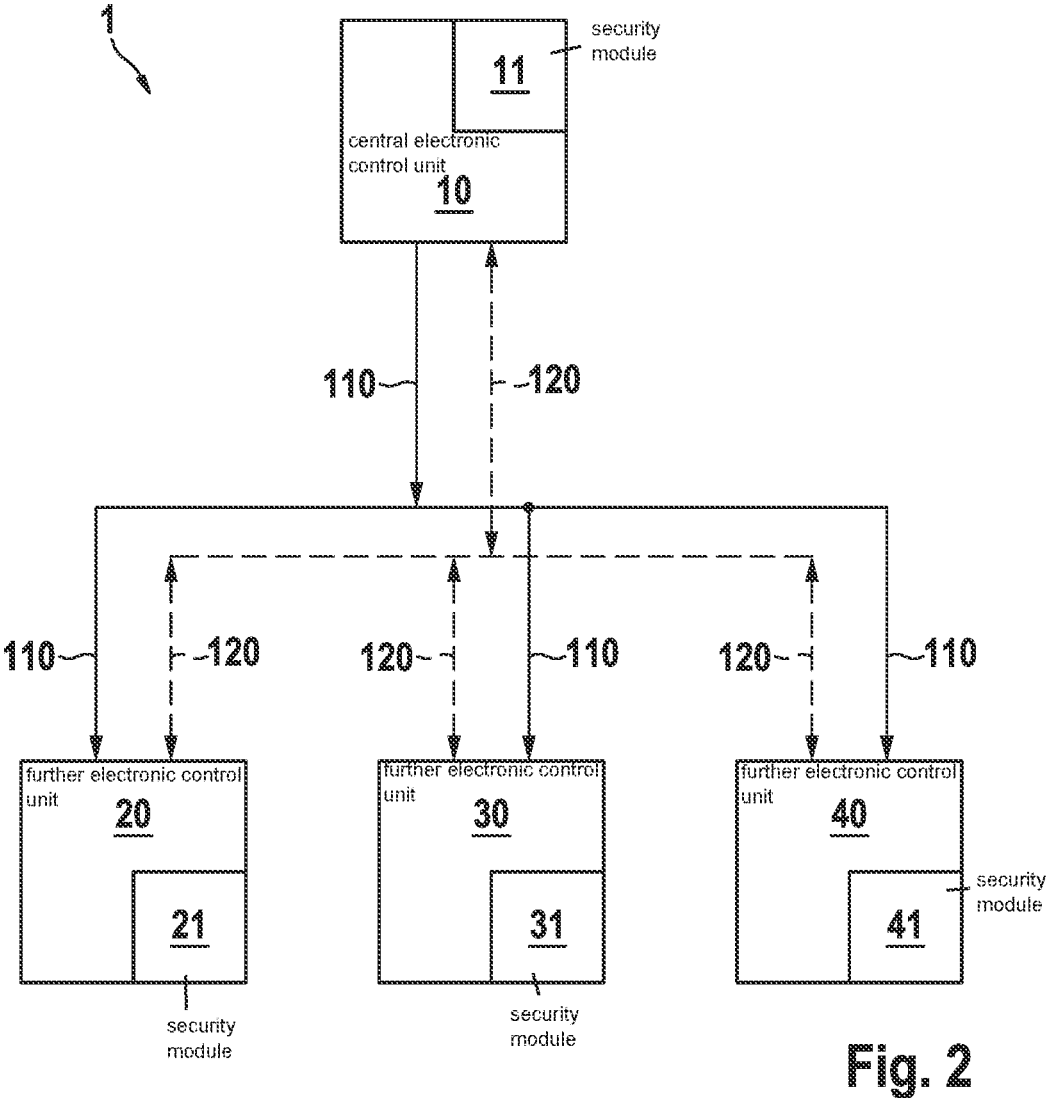
FIG. 2 schematically shows a third example of a method according to the present invention.

A third example of a method according to the present invention is schematically shown in FIG. 2. FIG. 2 shows a vehicle on-board communication network 1, a central electronic control unit 10 as well as further electronic control unit 20, 30, 40, all control units 10, 20, 30, 40 communicating 110, 120 with one another in an encrypted manner via on-board communication network 1, and/or exchanging data 110, 120 with one another in an encrypted manner. The communication as well as the data exchange may take place, for example, via a vehicle on-board bus (not depicted). Central control unit 10 is connected to the other electronic control units 20, 30, 40 via the on-board bus for communication with one another. Central electronic control unit 10 and electronic control units 20, 30, 40 each include a security module 11, 21, 31, 41. On-board communication network 1 includes a plurality of electronic control units 10,

20, 30, 40, which communicate with one another, for example, by signing and by encrypting their messages to be transferred.

Security module 11, 21, 31, 41 may be provided as a so-called Hardware Security Module (HSM), which carries out the cryptographic or encryption activities in on-board communication network 1.

Central electronic control unit 10 may be provided in a vehicle on-board communication network 1 or in a secure, so-called Secure OnBoard Communication as Security OnBoard Communication Master (SecOC Master). Further electronic control units 20, 30, 40 may be provided as Security OnBoard Communication Slaves 20, 30, 40.

Pieces of information and/or cryptographic keys may be exchanged 110, 120 within on-board communication network 1 between electronic control units 10, 20, 30, 40 in order, for example, to thereby start, to control, to influence or to terminate one or multiple vehicle functions. One such vehicle function may, for example, be an immobilizer or the vehicle braking system or an infotainment unit of the vehicle.

During the initialization of a vehicle-bound power supply time period of a vehicle, which is also known to those skilled in the art as a so-called power cycle, central electronic control unit 10 generates in step 100 (not depicted) one to multiple, i.e., 1 to n, cryptographic keys for the respectively initialized power cycle of the vehicle.

These generated one to n cryptographic keys are transferred 110 with the aid of an asymmetrical encryption by central electronic control unit 10 to further electronic control units 20, 30, 40 in on-board communication network 1.

Respective electronic control unit 20, 30, 40 decrypts the transferred cryptographic keys for further communication with the other electronic control units for the duration of the power cycle. Electronic control unit 20 uses 120 transferred 110 cryptographic keys for a symmetrical and/or asymmetrical encryption of a piece of information for a communication with electronic control unit 30 for the duration of the respective power cycle.

The cryptographic keys are thus recreated in each power cycle by central electronic control unit 10 and then distributed with the aid of the asymmetrical and/or symmetrical encryption to further electronic control units 20, 30, 40.

The preceding explanation of the specific embodiments describes the present invention solely within the scope of examples. Individual features of the specific embodiments may, if technically meaningful, be freely combined with one another without departing from the scope of the present invention.

What is claimed is:

1. A method for using cryptographic keys in a vehicle on-board communication network, the method comprising, during an initialization of a vehicle-bound power supply time period of a vehicle, the following steps:

generating at least one cryptographic key by a central electronic control unit for the respective initialized vehicle-bound power supply time period of the vehicle;

transferring the generated at least one cryptographic key by the central electronic control unit using at least one cryptographic algorithm to at least one further electronic control unit in the on-board communication network;

using the transferred cryptographic key by at least one electronic control unit for at least one further or for the same cryptographic algorithm for a communication between the electronic control units for a duration of the respective initialized vehicle-bound power supply time period in the on-board communication network, wherein the cryptographic algorithm includes a combination of a digital signing algorithm and one each of a symmetrical and asymmetrical encryption algorithms; and establishing at least one further electronic control unit as a further central electronic control unit in the event of a malfunction of the central electronic control unit, wherein the established further central electronic control unit remains established for the duration of the respective initialized vehicle-bound power supply time period.

2. The method as recited in claim 1, wherein the method further comprises the following step:

applying a key derivation function for generating a cryptographic key via at least one electronic control unit.

3. The method as recited in claim 2, wherein the key derivation function includes a password hash function or another password-based key derivation function.

4. The method as recited in claim 2, wherein the method further comprises the following steps:

decrypting the transferred at least one cryptographic key by the at least one further electronic control unit in the on-board communication network;

storing the decrypted cryptographic key in a security module of the respective electronic control unit for the duration of the respective initialized vehicle-bound power supply time period.

5. The method as recited in claim 1, wherein the method further comprises the following step:

storing the transferred cryptographic key in a security module of the central electronic control unit for the duration of the respective initialized vehicle-bound power supply time period.

6. The method as recited in claim 1, wherein the initialization of the vehicle-bound power supply time period is provided by an opening of the vehicle or by a starting of the vehicle or by a starting of a vehicle analysis.

7. A non-transitory computer-readable storage medium on which is stored a computer program including commands for using cryptographic keys in a vehicle on-board communication network, the computer program, when executed by a computer, causing the computer to perform, during an initialization of a vehicle-bound power supply time period of a vehicle, the following steps:

generating at least one cryptographic key by a central electronic control unit for the respective initialized vehicle-bound power supply time period of the vehicle;

transferring the generated at least one cryptographic key by the central electronic control unit using at least one cryptographic algorithm to at least one further electronic control unit in the on-board communication network;

using the transferred cryptographic key by at least one electronic control unit for at least one further or for the same cryptographic algorithm for a communication between the electronic control units for a duration of the respective initialized vehicle-bound power supply time period in the on-board communication network, wherein the cryptographic algorithm includes a combination of a digital signing algorithm and one each of a symmetrical and asymmetrical encryption algorithms; and establishing at least one further electronic control unit as a further central electronic control unit in the event of a malfunction of the central electronic control unit, wherein the established further central electronic control unit remains established for the duration of the respective initialized vehicle-bound power supply time period.

8. A device for data processing, which is configured for using cryptographic keys in a vehicle on-board communication network, the device configured to, during an initialization of a vehicle-bound power supply time period of a vehicle:

generate at least one cryptographic key by a central electronic control unit for the respective initialized vehicle-bound power supply time period of the vehicle;

transfer the generated at least one cryptographic key by the central electronic control unit using at least one cryptographic algorithm to at least one further electronic control unit in the on-board communication network;

use the transferred cryptographic key by at least one electronic control unit for at least one further or for the same cryptographic algorithm for a communication between the electronic control units for a duration of the respective initialized vehicle-bound power supply time period in the on-board communication network, wherein the cryptographic algorithm includes a combination of a digital signing algorithm and one each of a symmetrical and asymmetrical encryption algorithms; and establish at least one further electronic control unit as a further central electronic control unit in the event of a malfunction of the central electronic control unit, wherein the established further central electronic control unit remains established for the duration of the respective initialized vehicle-bound power supply time period.

9. A vehicle configured for using cryptographic keys in a vehicle on-board communication network, the vehicle configured to, during an initialization of a vehicle-bound power supply time period of a vehicle:

generate at least one cryptographic key by a central electronic control unit for the respective initialized vehicle-bound power supply time period of the vehicle;

transfer the generated at least one cryptographic key by the central electronic control unit using at least one cryptographic algorithm to at least one further electronic control unit in the on-board communication network;

use the transferred cryptographic key by at least one electronic control unit for at least one further or for the same cryptographic algorithm for a communication between the electronic control units for a duration of the respective initialized vehicle-bound power supply time period in the on-board communication network, wherein the cryptographic algorithm includes a combination of a digital signing algorithm and one each of a symmetrical and asymmetrical encryption algorithms; and establishing at least one further electronic control unit as a further central electronic control unit in the event of a malfunction of the central electronic control unit, wherein the established further central electronic control unit remains established for the duration of the respective initialized vehicle-bound power supply time period.

* * * * *